Patented Nov. 23, 1948

2,454,679

UNITED STATES PATENT OFFICE 2,454,679

GRAY ACID ANTHRAQUINONE DYESTUFFS

Glen M. Smyth, Plainfield, N. J., assignor to American Cyanamid Company, New York, N. Y., a corporation of Maine No Drawing. Application September 11, 1946, Serial No. 696,381

4 Claims. (Cl. 260—367)

This invention relates to sulfonated triamino dianthrimides which are acid dyestuffs.

According to the present invention triamino dianthrimides of the following formula:

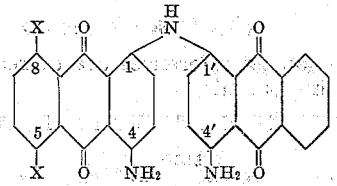

in which one X stands for a hydrogen atom and the other one stands for an amino group, are sulfonated to introduce at least one, and preferably not more than three, sulfonic acid groups.

The new dyestuffs dye wool gray shades of excellent light fastness from an acid bath. The dyeings may be top chromed to increase fastness. An important property of the new dyestuffs is that they dye fibers nearer to a true gray than do those known gray dyes of somewhat related structure.

The triamino dianthrimides may be prepared, for example, by the processes described in my Patent No. 2,385,113, issued September 18, 1945. Essentially, the process includes the following reactions. 5-nitroanthraquinone-1-sulfonic acid or the 1,8 isomer is transformed into the corresponding chlorine compounds with chlorinating agents. The nitro alpha chloroanthraquinone is then condensed with alpha aminoanthraquinone to produce the 5 or 8 nitro 1,1'-dianthrimide, followed by nitration to introduce 2 nitro groups in the 4 and 4' positions, and the trinitro compound thus produced is then reduced to the triamino 1,1'-dianthrimide.

A further important advantage of the present invention lies in the fact that the sulfonic acids from the two isomers, that is to say, the 4,5,4'-triamino 1,1'-dianthrimide and 4,8,4'-triamino 1,1'-dianthrimide dye wool substantially the same shade of gray. It is therefore immaterial which isomer is used. This makes it possible to utilize whichever isomer is available at lowest cost or to use a by-product from the production of the other isomeric triamino dianthrimide. A further important property, resulting from this fact, is that mixtures of the isomers may be used regardless of the proportions of the two constituents. This is of considerable practical importance because the starting material for preparing the triamino dianthrimides, 1-sulfo-8-nitroanthraquinone and 1-sulfo-5-nitroanthraquinone, is obtained in the form of mixtures of the isomers, which mixture is considerably cheaper to produce than is either isomer alone, because it is not necessary to effect any expensive separation. The possibility of using various proportions of the isomers is a remarkable one, as usually when mixtures of isomers are used in anthraquinone dyestuffs, the shade suffers and dull, muddy looking colors result. The acid dyestuffs of the present invention constitute one of those rare exceptions where the mixture of isomers gives colors of the same desirable shades and dyeing properties as the pure individual isomers alone.

The largest field of utility for the dyestuffs of the present invention is in dyeing wool, although they are also suitable for dyeing other basic nitrogenous fibers. In dying it makes little difference how many sulfonic groups are introduced into the molecule, and in fact products are usually produced which are mixtures containing a major portion of disulfonic acids, together with some mono-sulfonic and tri-sulfonic acids. The exact location of the sulfonic groups has not been determined, and as it is not material to the utility of the dyestuffs, the present invention is not intended to be limited to any particular theory of where the different sulfonic groups enter.

The invention will be described in greater detail in conjunction with the following specific examples. The parts are by weight.

*Example 1*

15 parts of well ground 8,4,4'-triamino-1,1'-dianthrimide are slowly added to 150 parts of 30% oleum, the temperature being maintained under 25° C. during the addition. When solution is complete the temperature is raised to about 80-85° C. and maintained for a number of hours until reaction is substantially complete, which can be determined by placing a drop of the solution in a large excess of dilute aqueous sodium carbonate solution. When the reaction is complete a clear solution results.

The reaction mixture is then drowned in 1000 parts of cold water, resulting in the production of a slurry which is filtered. The filtrate is of a light brownish color. The filter cake is washed with cold water until the washings turn a light bluish color and then washed with 10% sodium chloride solution until the washings are neutral to Congo paper. The cake is then sucked as dry as possible to remove excess brine, and it is then dried at 90° C.

The temperature of sulfonation may be varied, but changes in the sulfonation temperature affect the shade. In general grayer shades are obtained at higher temperatures.

*Example 2*

15 parts of well ground 5,4,4'-triamino-1,1'-dianthrimide are slowly added to 150 parts of 30% oleum, the temperature being maintained under 25° C. during the addition. The temperature is then raised to 110° C. and maintained there until reaction is substantially complete. The charge is then drowned in 1000 parts of cold water and filtered, the filter cake being washed with 10% sodium chloride brine until the washings are neutral to Congo paper, and then dried at 90° C.

*Example 3*

A crude mixture of 5,4,4'-triamino and 8,4,4'-triamino-1,1'-dianthrimides prepared as described in Example 6 of U. S. Patent 2,385,113, are sulfonated and recovered by the procedure of Example 1. The mixture dyes similar shades and has similar properties to the dyestuffs of Examples 1 and 2.

The dyestuffs as isolated in the preceding examples are in the form of their free acids. They may be transformed into their water-soluble sodium or other alkali metal salts by reaction with a base such as sodium carbonate. The free acids and water-soluble salts of the products are interchangeably usable and both are included in the claims.

I claim:

1. Sulfonic acids of triamino dianthrimides having the formula:

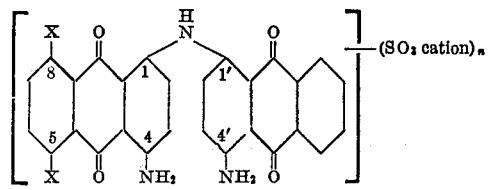

in which one X stands for a hydrogen atom and the other X for an amino group, the cation is selected from the group consisting of hydrogen and alkali metals, and $n$ is a whole number included in the group consisting of 1, 2 and 3.

2. Compounds according to claim 1 in which the triamino-dianthrimide is 4,5,4'-triamino-1,1'-dianthrimide.

3. Compounds according to claim 1 in which the triamino-dianthrimide is 4,8,4'-triamino-1,1'-dianthrimide.

4. Compounds according to claim 1 in which the triamino-dianthrimides consist of a mixture of 4,5,4'-triamino-1,1'-dianthrimide and 4,8,4'-triamino-1,1'-dianthrimide.

GLEN M. SMYTH.

REFERENCES CITED

The following references are of record in the file of this patent:

UNITED STATES PATENTS

| Number | Name | Date |
|---|---|---|
| Re. 16,427 | Reader et al. | Sept. 21, 1946 |